United States Patent [19]
Itoh et al.

[11] Patent Number: 5,903,315
[45] Date of Patent: May 11, 1999

[54] DOUBLE WINDOW DISPLAY APPARATUS

[75] Inventors: Hisakatsu Itoh; Yoshihiko Ogawa; Kazuhiko Muguruma, all of Yokohama, Japan

[73] Assignee: Kabushiki Kaisha Toshiba, Kawasaki, Japan

[21] Appl. No.: 08/843,983

[22] Filed: Apr. 17, 1997

[30] Foreign Application Priority Data

Apr. 18, 1996 [JP] Japan .................................. 8-097033

[51] Int. Cl.⁶ .................................................. H04N 5/262
[52] U.S. Cl. ........................................... 348/564; 348/588
[58] Field of Search ..................................... 348/563, 564, 348/565, 576, 581, 588, 566, 567, 568, 584, 598, 599, 913

[56] References Cited

U.S. PATENT DOCUMENTS

| | | | |
|---|---|---|---|
| 5,025,315 | 6/1991 | Johary et al. | 358/140 |
| 5,283,651 | 2/1994 | Ishizuka | 348/704 |
| 5,329,369 | 7/1994 | Willis et al. | 348/556 |
| 5,363,143 | 11/1994 | Duffield | 348/564 |
| 5,365,278 | 11/1994 | Willis | 348/581 |
| 5,434,625 | 7/1995 | Willis | 348/564 |
| 5,638,485 | 6/1997 | Kobayashi et al. | 386/123 |

FOREIGN PATENT DOCUMENTS

| | | |
|---|---|---|
| 0 660 601 | 6/1995 | European Pat. Off. . |
| 91/19395 | 12/1991 | WIPO . |

OTHER PUBLICATIONS

Kageyama et al: "A Study on Scan–Line Conversion of Letter–Box Methods for Wide Aspect TV" ITEJ Technical Report vol. 14, No. 8, pp. 31–36, BCS'90–6 (Jan. 1990).

*Primary Examiner*—Andrew I. Faile
*Assistant Examiner*—Uyen Le
*Attorney, Agent, or Firm*—Pillsbury Madison & Sutro LLP

[57] ABSTRACT

First and second images are separated into luminance and chrominance components to generate a first signal, in which the luminance components of the two images are sequentially located in the 1 H period and a second signal in which the chrominance components of the two images are located in the same. The second signal is delayed by (½) H period. The first signal and the delayed second signal are used to generate a third signal in which the luminance and chrominance components of the first image are sequentially located in the 1 H period and a fourth signal in which the luminance and chrominance components of the second image are located in the same. The third and fourth signals are vertically expanded with arbitrary expansion ratios. Then, the expanded signals are synthesized to generate a fifth signal in which the luminance components of the first and second images are sequentially located in the 1 H period and a sixth signal in which the chrominance components of the first and second images are located in the same. The fifth signal is delayed by (½) H period. The sixth signal and the delayed fifth signal are interpolated to make uniform the intervals among the scanning lines.

7 Claims, 12 Drawing Sheets

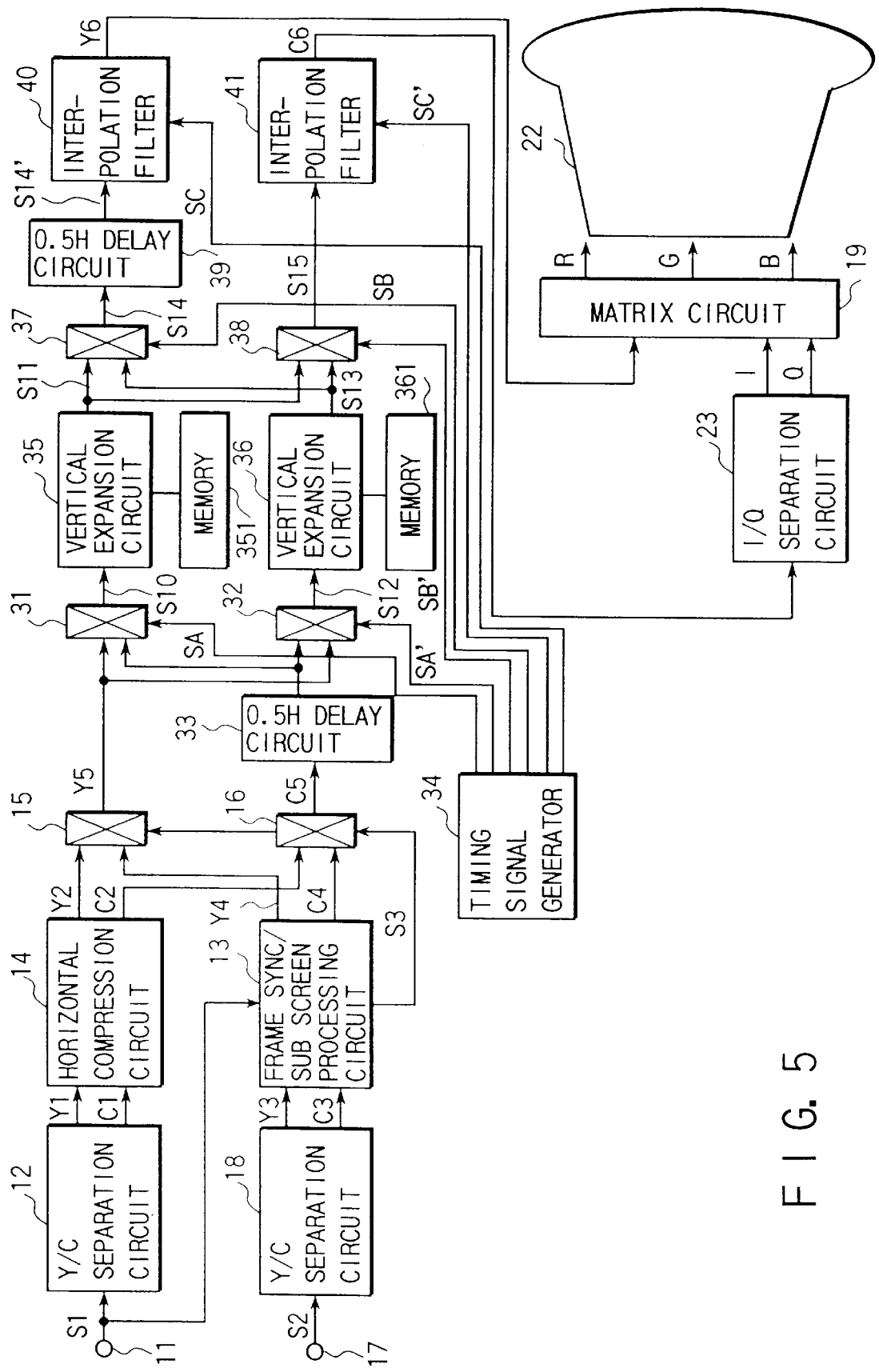
F I G. 5

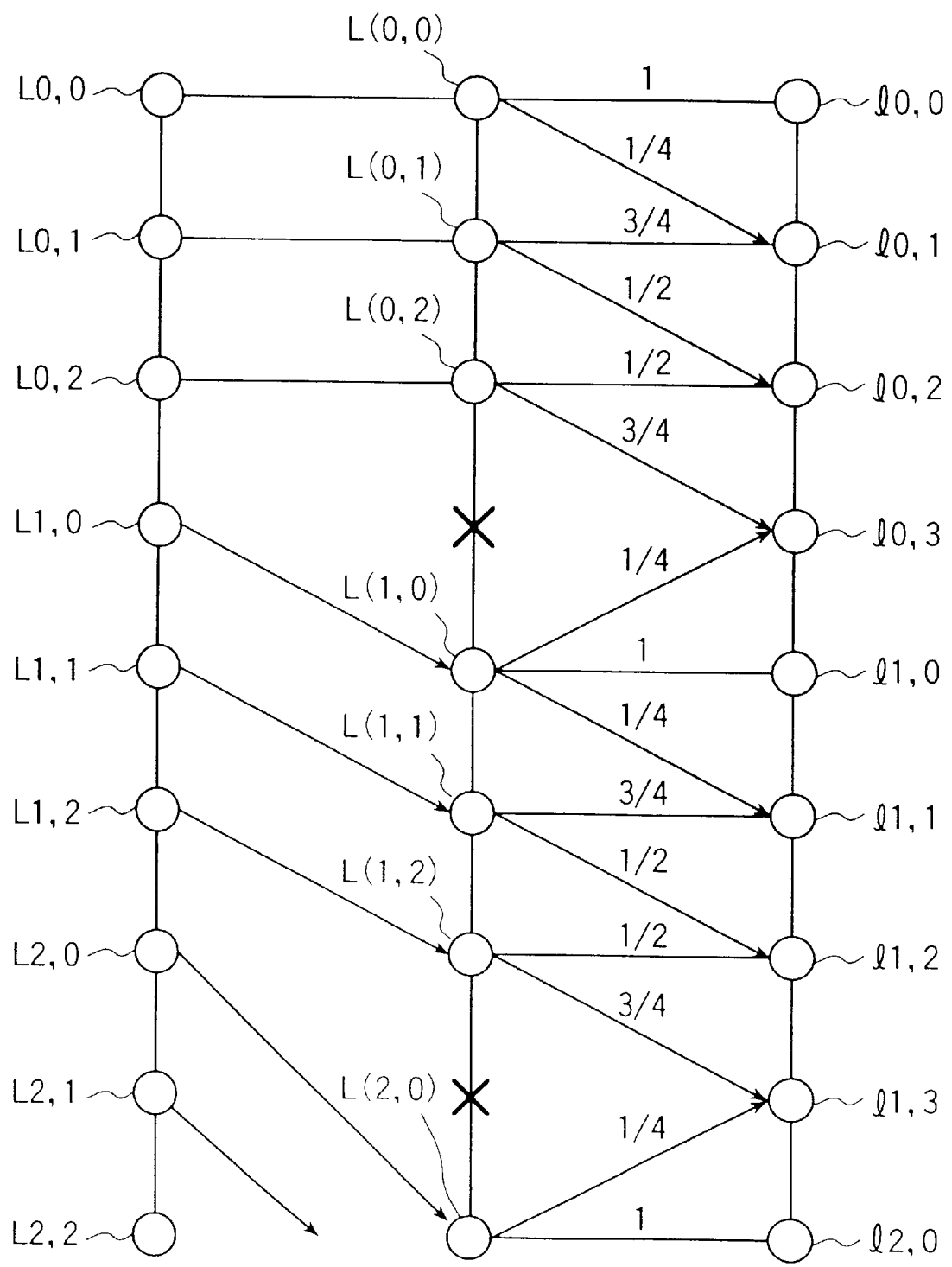
F I G. 6

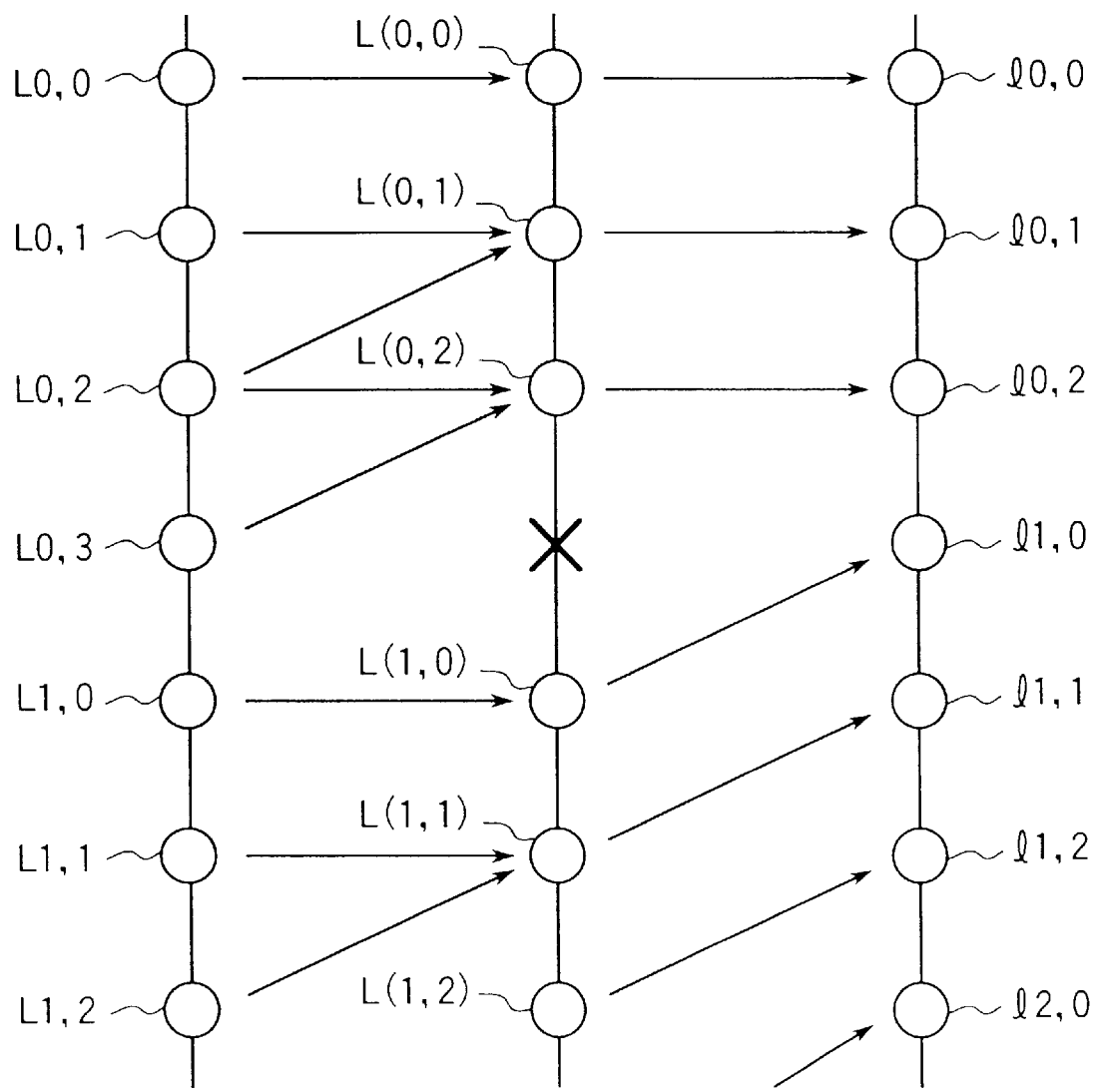
F I G. 9

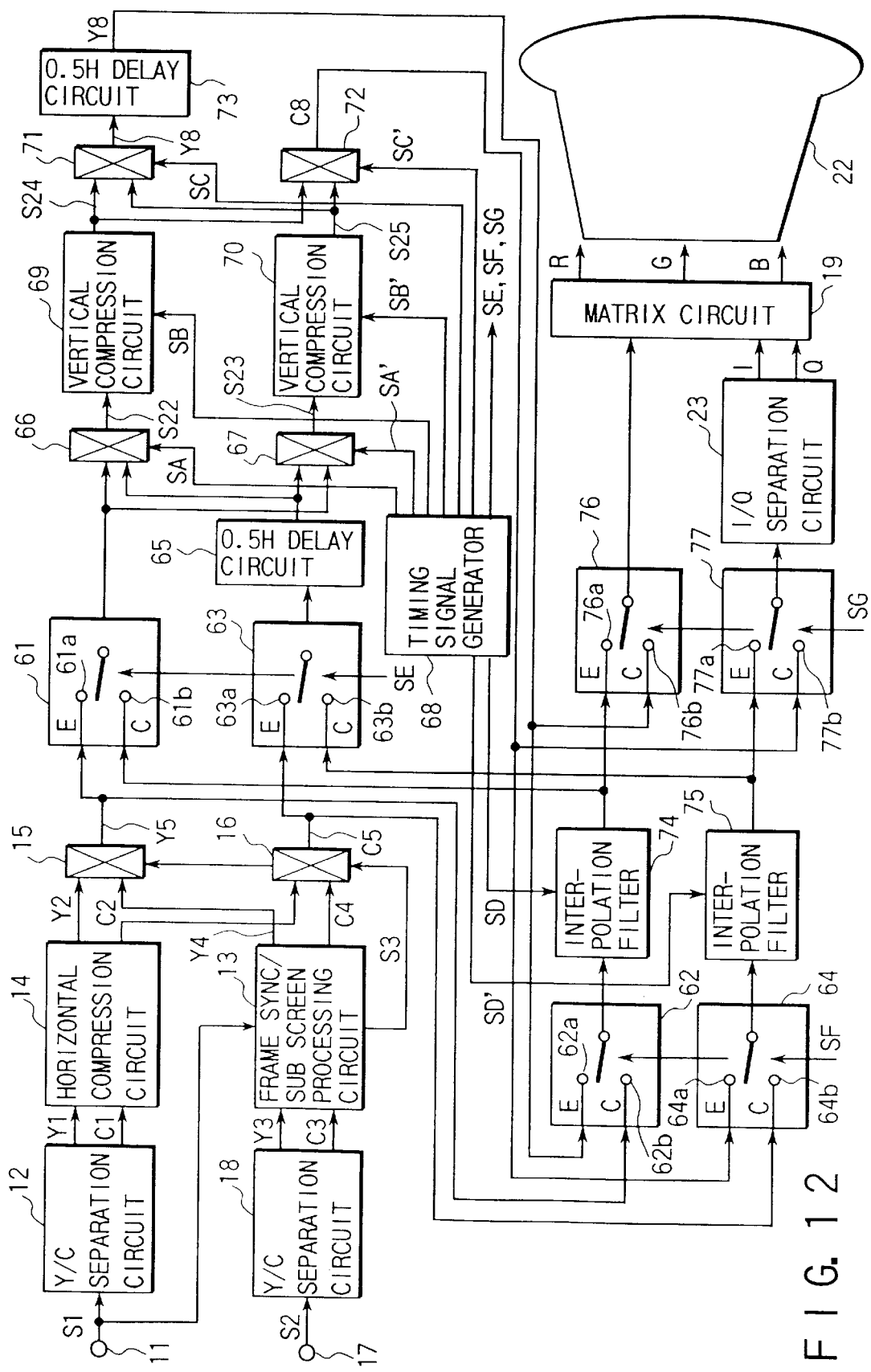
F I G. 12

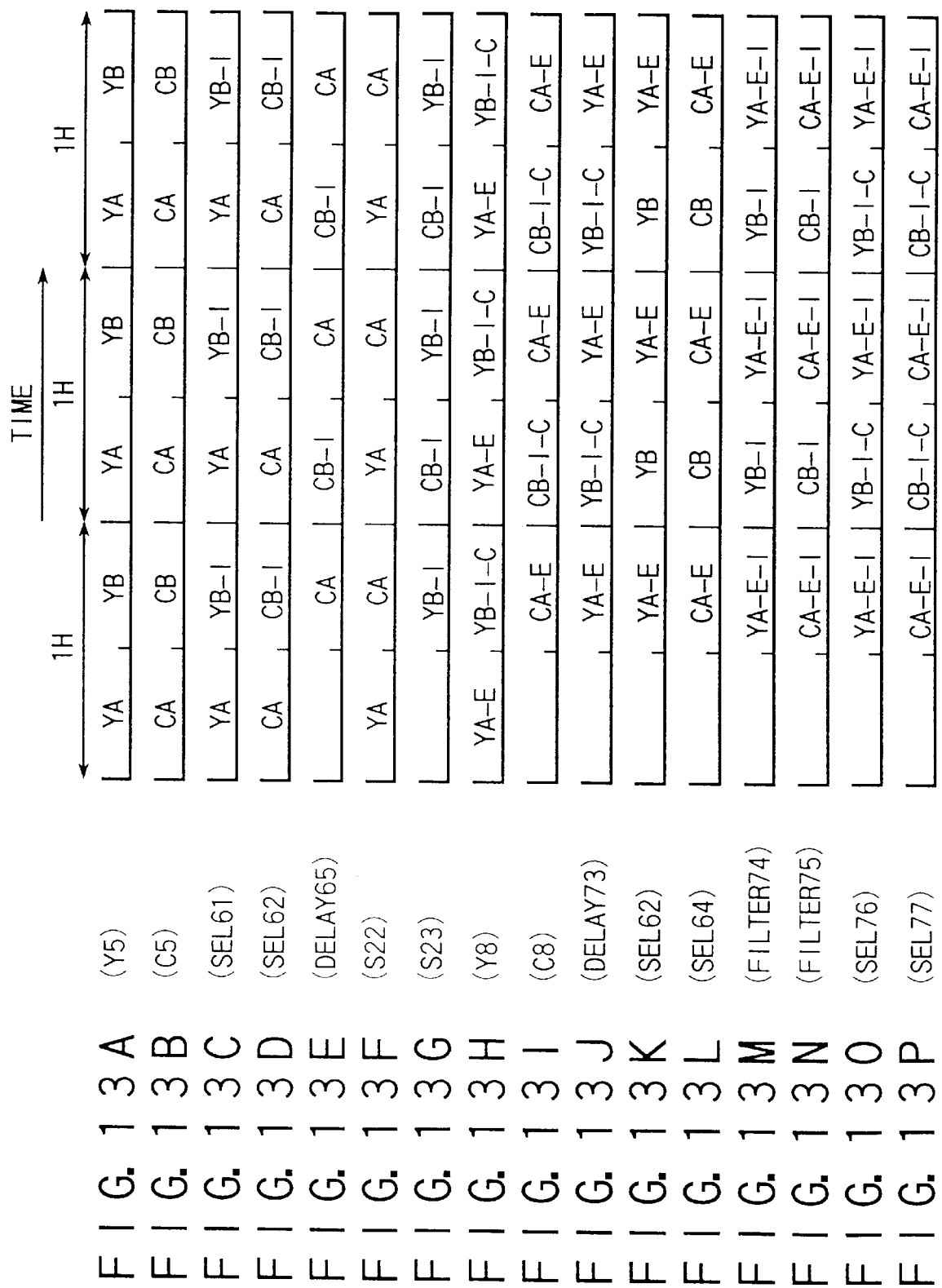

DOUBLE WINDOW DISPLAY APPARATUS

BACKGROUND OF THE INVENTION

The present invention relates to a double window display apparatus which is capable of displaying two images at right and left portions of one image display screen and varying display magnification of each of right and left images.

This application is based on Japanese Patent Application No. 08-97033, filed Apr. 18, 1997, the content of which is incorporated herein by reference.

An image displaying apparatus capable of displaying two images on one screen has been known. Although only picture-in-picture method has been known with which a sub-screen is inserted into a main screen, a trend of widening (in the lateral direction) the television image has, in recent years, permitted a double window system to be adapted to the wide screen such that two image are displayed in parallel in the lateral direction of the screen. That is, a main screen is displayed in the left-hand portion of the screen, while a sub-screen is displayed in the right-hand portion of the same.

On the other hand, a color television signal of the NTSC (National Television System Committee) method which has been employed in Japan has an aspect ratio of the screen of 4:3. The HDTV (High Definition Television), which is in a research and development stage, recommends a more laterally-wide aspect ratio of 16:9. As a method enabling a program in the form of the wide screen to be received by the conventional NTSC television tuner, a letter box system has been employed. The letter box system is a system structured as shown in FIG. 1 such that a laterally-elongated window having a wide aspect ratio of 16:9 is displayed in the central portion of a screen having an aspect ratio of 4:3 while making the upper and lower peripheral portions to be non-image regions.

FIG. 2 shows the structure of a conventional television tuner employing the letter box system to display two images on a screen comprising, for example, a CRT monitor. First composite video signal S1 for the main screen supplied to a first input terminal 11 is supplied to a Y/C (luminance/chrominance) separation circuit 12 and a frame synchronizing/sub-screen processing circuit 13. The Y/C separation circuit 12 separates the first composite video signal S1 into luminance signal Y1 and chrominance signal C1. The luminance signal Y1 and the chrominance signal C1 are supplied to a horizontal compression circuit 14. The horizontal compression circuit 14 compresses, to ½, the input luminance signal Y1 and the chrominance signal C1 in a horizontal direction so as to output compressed luminance signal Y2 and chrominance signal C2. The output luminance signal Y2 is supplied to one of input terminals of a selector 15, while the chrominance signal C2 is supplied to one of input terminals of a selector 16.

The second composite video signal S2 for the sub-screen supplied to the second input terminal is, by a Y/C separation circuit 18, separated into luminance signal Y3 and chrominance signal C3 so as to be supplied to a frame synchronizing/sub-screen processing circuit 13. The frame synchronizing/sub-screen processing circuit 13 initially synchronizes the first composite video signal S1 and the luminance signal Y3 and the chrominance signal C3, which are included in the second composite video signal, so as to correct deviation in the synchronization between the two images, if necessary. Then, the frame synchronizing/sub-screen processing circuit 13 subjects the luminance signal Y3 and the chrominance signal C3 output from the Y/C separation circuit 18 to a sub-screen process to form a right-half image of the double screen. Luminance signal Y4 subjected to the sub-screen process is supplied to another input terminal of the selector 15, while chrominance signal C4 subjected to the sub-screen process is supplied to another input terminal of the selector 16.

The frame synchronizing/sub-screen processing circuit 13 also outputs selection signal S3. The selection signal S3 is supplied to the selectors 15 and 16. The selection signal S3 has a low level during a second half of the horizontal scanning period.

In response to the selection signal S3 supplied from the frame synchronizing/sub-screen processing circuit 13, the selector 15 alternately and selectively outputs the luminance signal Y2, which is included in the first composite video signal, and the luminance signal Y4, which is included in the second composite video signal in each (½) H period ((½) horizontal scanning period). When the level of the selection signal S3 is high (in the first half portion of the horizontal scanning period), the selector 15 selects the luminance signal Y2 which is included in the first composite video signal. When the level is low (in the second period of the horizontal scanning period), the selector 15 selects the luminance signal Y4 which is included in the second composite video signal. Selected luminance signal Y5 is supplied to a first input terminal of a matrix circuit 19.

In response to the selection signal S3 supplied from the frame synchronizing/sub-screen processing circuit 13, the selector 16 alternately and selectively outputs the chrominance signal C2 which is included in the first composite video signal and the chrominance signal C4 which is included in the second composite video signal in each (½) H period ((½) horizontal scanning period). The selector 16 selects the chrominance signal C2 which is included in the first composite video signal in the first half portion of the horizontal scanning period in which the level of the selection signal S3 is high and selects the chrominance signal C4 which is included in the second composite video signal in the second half portion of the horizontal scanning period in which the foregoing level is low. Selected chrominance signal C5 is subjected to a color demodulation process by an I/Q separation circuit 23 so as to be separated into color difference signals I and Q which are then supplied to second and third input terminals of the matrix circuit 19.

The matrix circuit 19 subjects the signals Y5, I and Q to a matrix conversion process so as to generate red, green and blue color signals R, G and B to output the same to a monitor 22 which is, for example, a CRT (Cathode Ray Tube) display device.

The image to be displayed on the monitor 22 may be retained to be an image of the letter box system as shown in FIG. 1. As an alternative to this, the image is expanded in the vertical direction to omit the upper and lower non-image portions, as shown in FIG. 3. When the image is expanded vertically, the microcomputer 20 calculates the expansion ratio in the vertical direction required to widen the image to the overall size of the screen. Then, the microcomputer 20 outputs mode switch signal MS including the vertical expansion ratio to a deflection-angle control circuit 21. In accordance with the mode switch signal MS, the deflection-angle control circuit 21 generates horizontal deflection signal SH and vertical deflection signal SV. The deflection-angle control circuit 21 controls the vertical deflection signal SV in accordance with the vertical expansion ratio to enlarge the deflection angle. The horizontal deflection signal SH and the vertical deflection signal SV are supplied to the monitor 22 so as to be subjected to a process for deflecting electron beams. If the microcomputer 20 outputs, to the deflection-angle control circuit 21, mode switch signal MS including vertical compression ratio in stead of the vertical expansion ratio, the deflection-angle control circuit 21 controls the vertical deflection signal SV to reduce the deflection angle in accordance with the vertical compression ratio.

FIG. 4 shows states of the first composite video signal and the second composite video signal. That is, the luminance signal Y2 and the chrominance signal C2 which are included in the first composite video signal and output from the horizontal compression circuit 14 form a left-half image of the double screen, as shown in the uppermost portion shown in FIG. 4. The signal components exist in only the first half portion of one horizontal scanning period. The luminance signal Y4 and the chrominance signal C4 which are included in the second composite video signal and output from the frame synchronizing/sub-screen processing circuit 13 form a right-half image of the double screen, as shown in the central portion shown in FIG. 4. The signal components exist in only the second half portion of one horizontal scanning period. The selector 15 alternately and selectively outputs the luminance signal Y2 which is included in the first composite video signal and the luminance signal Y4 which is included in the second composite video signal in each (½) H period in response to the selection signal S3. As shown in the lowermost portion shown in FIG. 4, the selected luminance signal Y5 has two types of luminance signal components in one horizontal scanning period. Also the selector 16 performs a similar operation so that chrominance signal C5 output from the selector 16 has two types of color components in one horizontal scanning period.

As described above, a display device of a type comprising the CRT is able to expand/compress an image in the vertical direction by controlling the deflection angle of the electron beams. However, control of the deflection angle causes the expansion and compression ratios not to be changed in each of the right and left windows of the double window. In an example case where the main screen and the sub-screen display different images (NTSC system and the HDTV system), it is not possible vertically expand only the HDTV image. Moreover, one of the images cannot be expanded and compressed by using the other image as a reference.

On the other hand, a display device comprising liquid crystal device is, differentially from the CRT, able to expand or compress the image by changing the number of the scanning lines in place of the control of the deflection angle. The letter box system uses 360 lines/frame in the central portion of the screen among an effective number of scanning lines of about 480 lines/frame for the NTSC system to transfer an image having the aspect ratio of 16:9. When an image of the letter box system is expanded and displayed on a television tuner having a wide screen (having an aspect ratio of 16:9), video signals for 360 effective scanning lines must be converted into video signals for 480 effective scanning lines, that is, a so-called 3-4 conversion must be performed.

In a case where a display device of the foregoing type comprising the LCD displays, on a double window, an image of the NTSC system having the aspect ratio of 4:3 and a wide image of the HDTV system having the aspect ratio of 16:9, two images can be processed with different expansion ratios or compression ratios. However, two image display devices must be provided for the right window and the left window, respectively. Thus, a field memory having a great capacity must be provided, thus causing a problem to arise in that the size of the structure and the cost cannot be reduced.

As described above, there arises a problem in that the double window system for displaying two images by dividing the display screen into the right and left windows cannot easily expand or compress the right and left images in the vertical direction with individual expansion ratios or compression ratios.

BRIEF SUMMARY OF THE INVENTION

Accordingly, it is an object of the present invention to provide a double window display apparatus which is capable of vertically expanding or compressing two images with different ratios and which is able to simplify the structure and reduce the cost.

According to one aspect of the present invention, there is provided a double window display apparatus comprising a display device having a display screen divided into first and second windows to display a first image on the first window and a second image on the second window, a first input terminal to which a first video signal is supplied, a second input terminal to which a second video signal is supplied, synthesizing means for synthesizing the first and second video signals supplied to the first and second input terminals to generate a third video signal, first scanning-line conversion means for expanding or compressing, to M times, the first video signal component of the third video signal corresponding to the first window in the vertical direction, and a second scanning-line conversion means for expanding or compressing, to N times, the second video signal component of the third video signal corresponding to the second window in the vertical direction.

The above-mentioned double window display apparatus enables right and left images on the double window display screen to respectively be expanded or compressed in the vertical direction.

According to another aspect of the present invention, there is provided a double window display apparatus comprising a display device having a display screen divided into first and second windows to display a first image on the first and second windows, a first input terminal to which a first video signal is supplied, first scanning-line conversion means for expanding or compressing, to M times, a portion of the first video signal corresponding to the first window in the vertical direction, and second scanning-line conversion means for expanding or compressing, to N times, a residual portion of the first video signal corresponding to the first window in the vertical direction.

As a result of the foregoing structure, when a video signal of an ordinary NTSC system is used to watch a program on the same channel or different channels by the double window display method, the right and left windows can individually be expanded or compressed in the vertical direction. Therefore, a preferred display for viewers can be performed.

According to still another aspect of the present invention, there is provided a double window display apparatus comprising a display device having a display screen divided into first and second windows to display a first image on the first window and a second image on the second window, a first input terminal to which a first video signal is supplied, a second input terminal to which a second video signal is supplied, first separation means for separating the first video signal into a third video signal and a fourth video signal in each horizontal scanning period, second separation means for separating the second video signal into a fifth video signal and a sixth video signal in each horizontal scanning period, first synthesizing means for synthesizing the third video signal and the fifth video signal in one horizontal scanning period, second synthesizing means for synthesizing the fourth video signal and the sixth video signal in one horizontal scanning period, means for writing an output from the first synthesizing means in a first memory, first conversion means for expanding or compressing the video signal in the vertical direction by controlling writing and reading the video signal to and from the first memory, means for writing an output from the second synthesizing means in a second memory, second conversion means for expanding or compressing the video signal in the vertical by controlling writing and reading the video signal to and from the second memory, third separation means for separating an output from the first conversion means into a seventh video signal formed by expanding or compressing the third video signal in the vertical direction and an eighth video signal formed by expanding or compressing the fifth video signal in the vertical direction, fourth separation means for separating an output from the second conversion means into a ninth video signal formed by expanding or compressing the fourth video signal in the vertical direction and a tenth video signal formed by expanding or compressing the sixth video signal in the vertical direction, third synthesizing means for synthesizing the seventh video signal and the ninth video signal, and a fourth synthesizing means for synthesizing the eighth video signal and the tenth video signal.

As a result of the foregoing structure, right and left images to be displayed by the double window method can individually be expanded or compressed without a necessity of enlarging the circuit structure.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a block diagram showing a first embodiment of a double window display apparatus according to the present invention;

FIG. 6 is a diagram showing the principle for changing the number of the scanning lines according to the first embodiment;

FIG. 9 is a diagram showing the principle for changing the number of the scanning lines according to the second embodiment;

FIG. 12 is a block diagram showing a fifth embodiment of the present invention; and FIGS. 13A to 13P are timing charts for explaining the operation of the fifth embodiment.

DETAILED DESCRIPTION OF THE INVENTION

A preferred embodiment of a double window apparatus according to the present invention will now be described with reference to the accompanying drawings.

Figure 1:
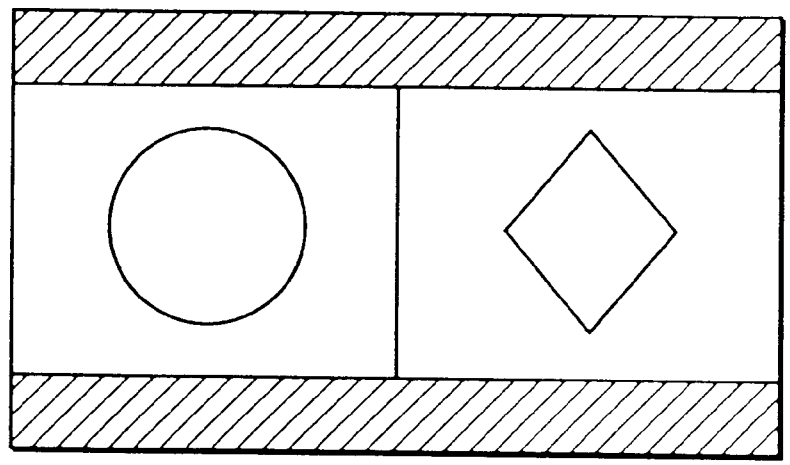
FIG. 1 is a diagram showing an example in which two television images of an NTSC system are displayed in parallel, by a letter box method, on a television tuner of a wide aspect ratio TV system.
Figure 3:
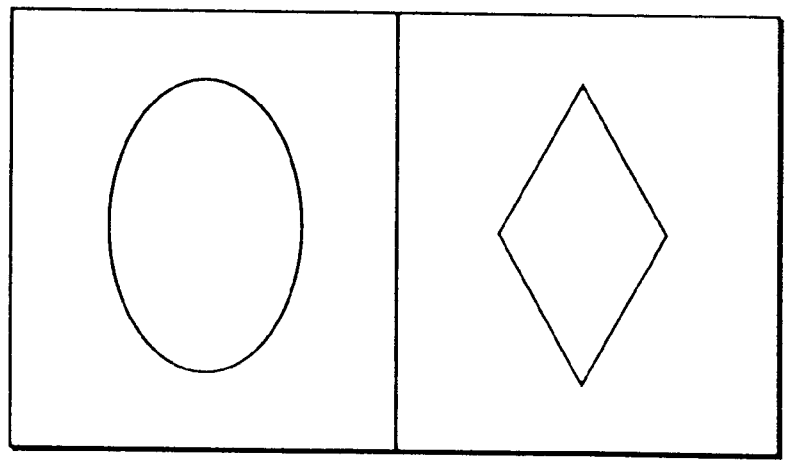
FIG. 3 is a diagram showing another example of the double window display performed by the conventional apparatus shown in FIG. 2.
Figure 2:
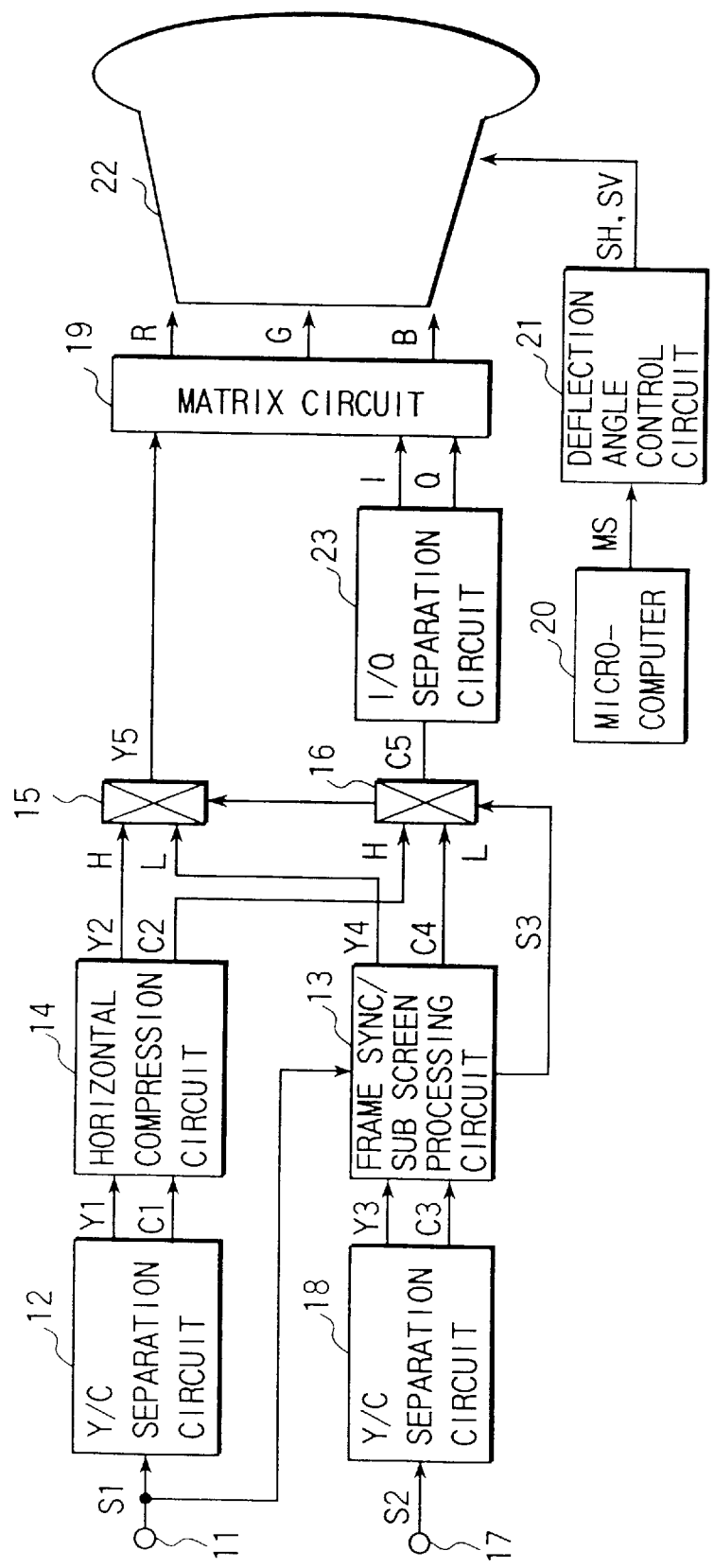
FIG. 2 is a block diagram showing a conventional television tuner for performing double window display.
Figure 4:
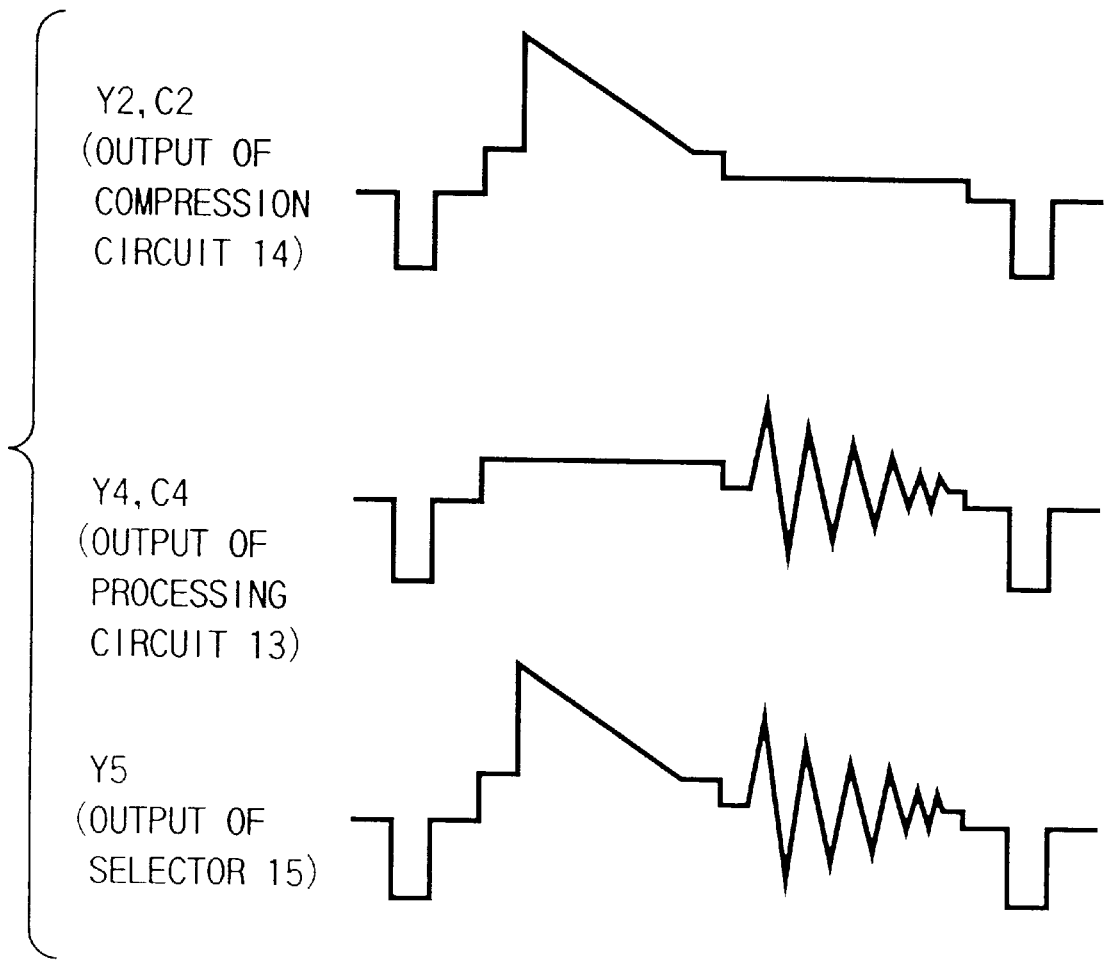
FIG. 4 is a graph showing signal waveforms formed when the double window display is performed by the conventional apparatus shown in FIG. 2.

FIG. 5 is a block diagram showing the structure of a first embodiment. Referring to FIG. 5, the same elements as those shown in FIG. 2 are given the same reference numerals. The first embodiment is different from the conventional example shown in FIG. 2 in that a (½) H delay circuit 33, selectors 31 and 32, a timing signal generator 34, vertical expansion circuits 35 and 36, memories 351 and 361, selectors 37 and 38, a (½) H delay circuit 39 and interpolation filters 40 and 41 are interposed and connected between the selectors 15 and 16, the matrix circuit 19 and the I/Q separation circuit 23. Moreover, a structure in which the microcomputer 20 and the deflection-angle control circuit 21 required for the conventional structure are omitted is different from the conventional structure.

Luminance signal Y5 selected and derived by the selector 15 is supplied to one of input terminals of the selector 31 and that of the selector 32. Chrominance signal C5 selected and derived by the selector 16 is delayed by (½) horizontal scanning line period from the luminance signal Y5 by the (½) H delay circuit 33, and then supplied to another input terminal of the selector 31 and another input terminal of the selector 32.

In response to the timing signal SA output from the timing signal generator 34, the selector 31 alternately and selectively outputs the luminance signal Y5 output from the selector 15 and the chrominance signal C5 output from the (½) H delay circuit 33 in each (½) H period. The timing signal generator 34 generates timing signals SA, SA', SB, SB', SC and SC' each having a pulse in each (½) H. These timing signals are supplied to the selectors 31, 32, 37 and 38 and the interpolation filters 40 and 41. The timing signals SA, SB and SC are opposite in phase to the timing signals SA', SB' and SC'.

The selector 32 alternately and selectively outputs the luminance signal Y5 output from the selector 15 and the chrominance signal C5 output from the (½) H delay circuit 33 in each (½) H period in response to the timing signal SA' output from the timing signal generator 34.

Video signal S10 selected and derived from the selector 31 is supplied to the vertical expansion circuit 35. The memory 351 is connected to the vertical expansion circuit 35 so that the video signal S10 output from the selector 31 is stored in the memory 351. A required expansion ratio is set to the vertical expansion circuit 35. Thus, in response to a control signal corresponding the expansion ratio, writing and reading of the video signal S10 to and from the memory 351 are controlled. As a result, the video signal S10 is expanded in the vertical direction. Expanded video signal S11 is supplied to one of input terminals of the selector 37 and one of input terminals of the selector 38.

Video signal S12 selected and derived from the selector 32 is expanded in the vertical direction by the vertical expansion circuit 36 to which the memory 361 is connected similarly to the vertical expansion circuit 35. Expanded video signal S13 is supplied to another input terminal of the selector 37 and another input terminal of the selector 38. The vertical expansion ratio can easily be changed between the right and left windows of the double window by changing the expansion ratios of the vertical expansion circuits 35 and 36.

In response to the timing signal SB output from the timing signal generator 34, the selector 37 alternately and selectively outputs the video signal S11 output from the vertical expansion circuit 35 and the video signal S13 output from the vertical expansion circuit 36 in each (½) H period. In response to the timing signal SB', the selector 38 alternately and selectively outputs the video signal S11 output from the vertical expansion circuit 35 and the video signal S13 output from the vertical expansion circuit 36 in each (½) H period.

Video signal S14 selected and derived from the selector 37 is delayed by (½) H period by the (½) H delay circuit 39. Delayed signal S14' output from the (½) H delay circuit 39 is supplied to the interpolation filter 40. Video signal S15 selected and derived from the selector 38 is supplied to the interpolation filter 41.

In response to the signal SC output from the timing signal generator 34, the interpolation filter 40 subjects the delayed signal S14' output from the interpolation filter 40 to an interpolation calculation process so as to generate luminance signal Y6 having the number of scanning lines increased to n times (n is a positive real number). Thus, the luminance signal is vertically expanded. The interpolation filter 40 outputs the luminance signal Y6 to a first input terminal of the matrix circuit 19.

Similarly, the interpolation filter 41 subjects the video signal S15 output from the selector 38 to an interpolation calculation process in response to the timing signal SC' output from the timing signal generator 34 to generate chrominance signal C6 having the number of scanning lines increased to n times (n is a positive real number). Thus, the chrominance signal is vertically expanded. The interpolation filter 41 outputs the chrominance signal C6 to the I/Q separation circuit 23. If the expansion ratios for the right and left windows are different from each other, the coefficients of the interpolation filters 40 and 41 are changed for the right and left windows on the basis of the timing signals SC and SC'.

The I/Q separation circuit 23 subjects the chrominance signal C6 to a demodulation process so as to separate the same into color difference signals I and Q to output the color difference signals I and Q to second and third input terminals of the matrix circuit 19. The matrix circuit 19 converts the input luminance signal Y6 and the color difference signals I and Q into color signals R, G and B for the color display to output the same to the monitor 22. The monitor 22 may be a conventional CRT display device or a display device having a fixed number of pixels, such as liquid crystal display device or a plasma display device.

FIG. 6 shows the operation for scanning line conversion according to the first embodiment. In this case, the number of the scanning lines is increased to, for example, 4/3 times. That is, three scanning lines for a video signal before the conversion is made to correspond to four scanning lines after the conversion. Specifically, one new scanning line is inserted for each three scanning lines. Intervals of pre-conversion scanning lines Lx,y (x is 0, 1, 2, . . ., y is 0, 1 or 2, and y is an index in a group of three scanning lines) shown on the leftmost column shown in FIG. 6 are elongated to two times in units of three scanning lines by the vertical expansion circuits 35 and 36. Thus, scanning lines L (x,y) as shown in the central column shown in FIG. 6 are obtained. In order to insert one new scanning line between two scanning lines formed apart from each other by the interval which is two times the usual interval, the interpolation filters 40 and 41 use adjacent scanning lines to perform an interpolation calculations. Thus, scanning lines lx,z (z is 0, 1, 2 or 3) on the rightmost column shown in FIG. 6 and formed such that the intervals are the same (the same intervals as those of the original scanning lines Lx,y) and the number of the scanning lines increased to 4/3 times is obtained.

FIGS. 7A to 7H show operations for processing the first composite video signal S1 and the second composite video signal S2 according to this embodiment. Referring FIGS. 7A to 7H, symbol YA indicates the luminance signal of the first composite video signal S1, while YB indicates a luminance signal of the second composite video signal S2. Similarly, symbol CA indicates the chrominance signal of the first composite video signal S1, while CB indicates the chrominance signal of the second composite video signal S2.

Figure 7:
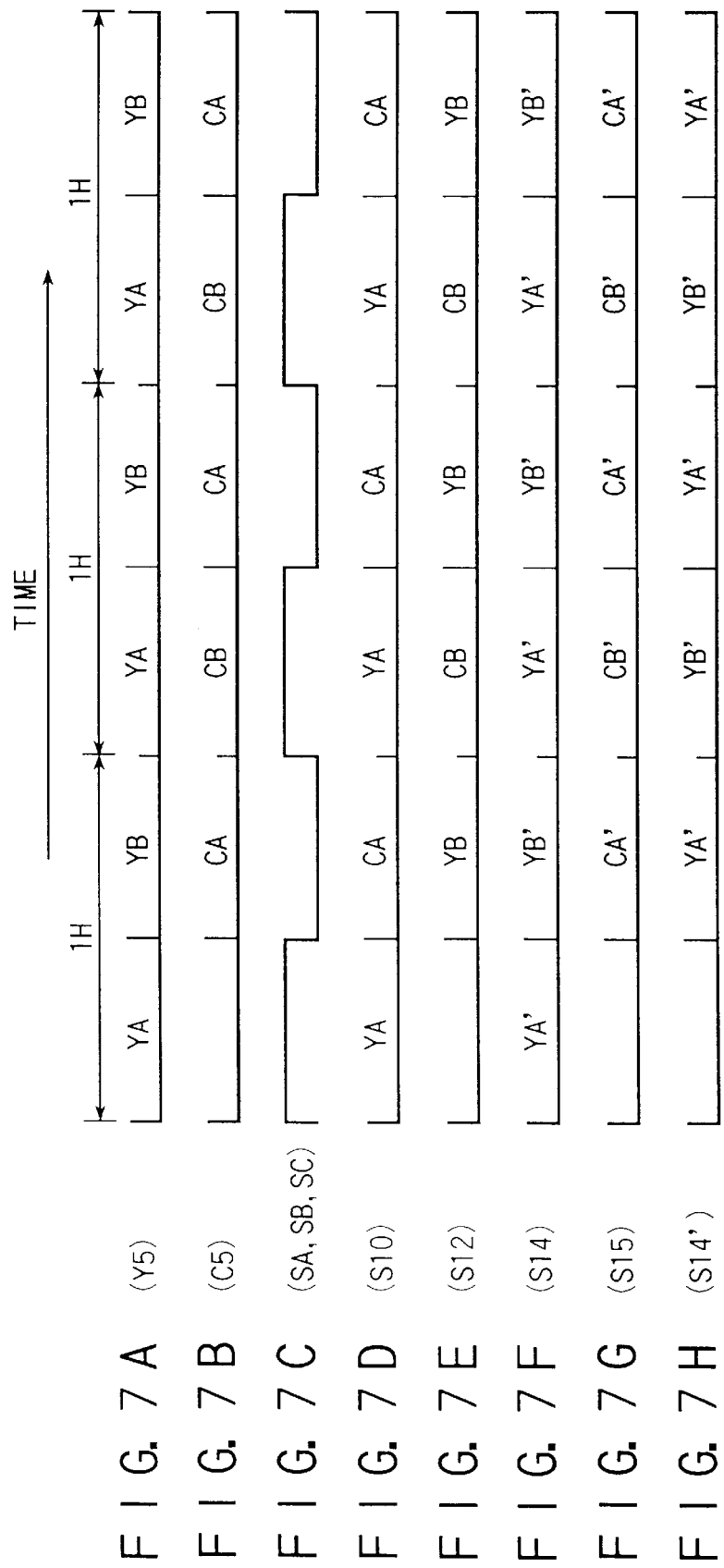
FIGS. 7A to 7H are timing charts for explaining the operation according to the first embodiment.

Luminance signal Y5 output from the selector 15 is, as shown in FIG. 7A, formed such that luminance signals YA and YB are sequentially located in a period of 1 H, while chrominance signal C5 output from the selector 16 and delayed by (½) H period by the (½) H delay circuit 33, as shown in FIG. 7B, formed such that luminance signals CB and CA are sequentially located in a period of 1 H. The luminance signal Y5 is supplied to one of input terminals of the selectors 31 and 32. The chrominance signal C5 is supplied to another input terminal of the selectors 31 and 32.

The timing signal generator 34 generates timing signals SA, SB and SC, the levels of each of which is high in the first half portion of the period 1 H and the levels of each of which is low in the second half portion of the same, as shown in FIG. 7C.

The selector 31 alternately selects the luminance signal Y5 and the chrominance signal C5 in each (½) H period in response to the timing signal SA. Thus, the selector 31 outputs the video signal S10 having YA in the first half portion of the period 1 H and CA in the second half portion of the same, as shown in FIG. 7D.

The selector 32, similarly to the selector 31, alternately selects the luminance signal Y5 and the chrominance signal C5 in each (½) H period in response to the timing signal SA', the phase of which is shifted from the timing signal SA by (½) H period. As a result, the selector 31 outputs video signal S12 having CB in the first half portion of the period 1 H and YB in the second half portion of the same, as shown in FIG. 7E.

The video signal S10 output from the selector 31 is converted into video signal S11 which is expanded in the vertical direction by the vertical expansion circuit 35, and then supplied to one of input terminals of the selector 37 and one of input terminals of the selector 38. Also the video signal S12 output from the selector 32 is converted into video signal S13 which is expended vertically by the vertical expansion circuit 36, and then supplied to another input terminal of the selector 37 and that of the selector 38.

In response to the timing signal SB, the selector 37 alternately selects the video signal S11 and the video signal S13 in each (½) H period. As a result, the selector 37 outputs video signal S14 having YA' expanded vertically in the first half portion of the period 1 H and YB' expanded vertically in the second half portion of the same, as shown in FIG. 7F.

Similarly to the selector 37, the selector 38 alternately selects the video signal S11 and the video signal S13 in each (½) H period in response to the timing signal SB', the phase of which is shifted from the timing signal SB by (½) H period. As a result, the selector 38 outputs video signal S15 having CB' expanded vertically in the first half portion of the period 1 H and CA' expanded vertically in the second half portion thereof, as shown in FIG. 7C. The video signal S15 is supplied to the interpolation filter 41 so that chrominance signal C6 interpolated as shown in FIG. 6 is supplied to the matrix circuit 19 through the I/Q separation circuit 23.

The luminance signal S14 output from the selector 37 is delayed by the (½) H delay circuit 39 by (½) H period so as to be supplied to the interpolation filter 40 as delayed signal S14' as shown in FIG. 7H. Then, the luminance signal Y6 interpolated by the interpolation filter 41 as shown in FIG. 6 is supplied to the matrix circuit 19.

As described above, according to this embodiment, the selectors 31, 32, 37 and 38 switch the vertical expansion circuits 35 and 36, the (½) H delay circuit 39 and the interpolation filters 40 and 41 so that the signals Y5 and C5 in the form in which the right and left window luminance signals and chrominance signals are arranged in the period 1 H are converted into the signals S10 and S12 in the form in which the luminance signal and the chrominance signal for the same window are arranged. Therefore, right and left video signals (the luminance signal and the chrominance signal) can be vertically expanded by using the respective vertical expansion circuits and the respective interpolation filters. If the selectors 31, 32, 37 and 38 are not provided, the vertical expansion circuits, the (½) H delay circuits and the interpolation filters must be provided for the luminance signals and the chrominance signals for the right and left windows. In this case, the size of the circuit is doubled. Thus, according to this embodiment, the right and left images for the double window display can be expanded with different vertical expansion ratio without enlargement of the size of the circuit (in particular, the capacity of the memory). Thus, an image having the size equivalent to the size of the screen or an image expanded adequately can be formed.

The first embodiment can be modified such that the (½) H delay circuit 39 is connected between the 24 interpolation filter 40 and the matrix circuit 19. In this modification, the filter coefficients of the filters 40 and 41 are somewhat changed.

Other embodiments of the present invention will now be described. The same elements as those according to the first embodiment are given the same reference numerals and the same elements are omitted from detailed description.

Figure 8:
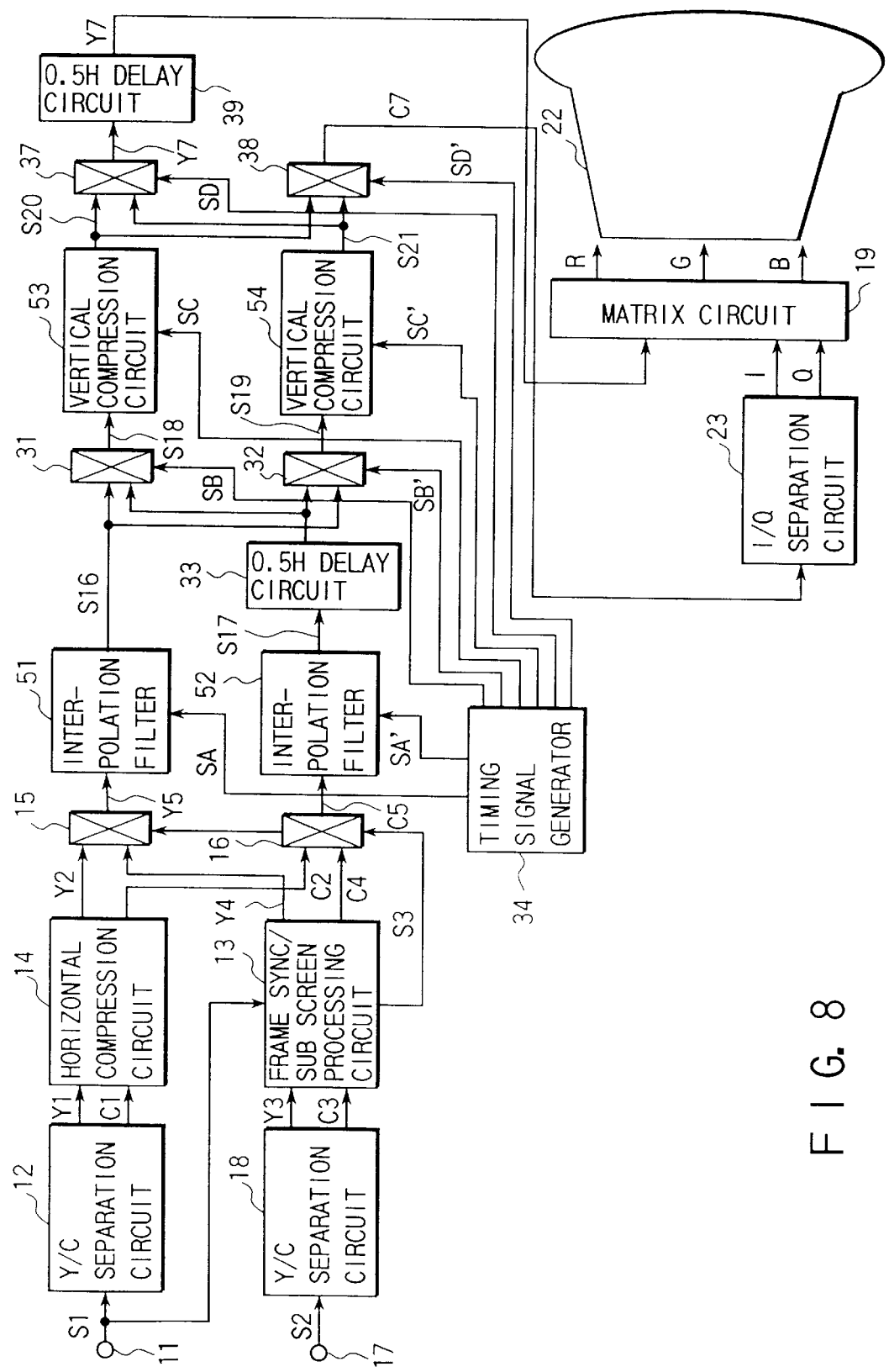
FIG. 8 is a block diagram showing a second embodiment of the present invention.

FIG. 8 is a circuit diagram showing a second embodiment of the present invention. In this embodiment, right and left images for the double window display are vertically compressed in place of the vertical expansion. Since the process to be performed to the step of synchronizing the two video signals and the horizontal compression process is performed is the same as that according to the first embodiment, the same elements as those shown in FIG. 5 are given the same reference numerals. The structure according to this embodiment is different from that of the first embodiment shown in FIG. 5 in that an interpolation filter 51 is connected between the selector 15 and the selectors 31 and 32, an interpolation filter 52 is connected between the selector 16 and the (½) H delay circuit 33, a vertical compression circuit 53 is connected between the selector 31 and the selectors 37 and 38, and a vertical compression circuit 54 is connected between the selector 32 and the selectors 37 and 38. The interpolation filters 51 and 52 are equivalent filters to the interpolation filters 40 and 41 according to the first embodiment.

The processes according to the second embodiment, to which the luminance signals and the chrominance signals are subjected, are the same as those of the first embodiment shown in FIGS. 7A to 7H except for a vertical compression process which is performed in place of the vertical expansion process.

The luminance signal Y5 selected and derived from the selector 15 is supplied to the interpolation filter 51, while the chrominance signal C5 selected and derived from the selector 16 is supplied to the interpolation filter 52. In response to timing signal SA output from the timing signal generator 34, the interpolation filter 51 converts the luminance signal Y5 into interpolated signal S16 corresponding to a required vertical compression ratio so as to supply the same to one of input terminals of the selector 31 and that of the selector 32. Similarly to the interpolation filter 51, the interpolation filter 52 converts the chrominance signal C5 into interpolated signal S17 corresponding to a required vertical compression ratio in response to the timing signal SA' output from the timing signal generator 34. The (½) H delay circuit 33 delays the interpolated signal S17 by (½) H period so as to supply the delayed signal to another input terminal of the selector 31 and that of the selector 32. In a case where the compression ratio is made to be different for the right and left windows, whether the image is that for the right window or left window is discriminated in accordance with the timing signals SA and SA' output from the timing signal generator 34. Moreover, different filter coefficients are used to generate interpolated signals.

The selector 31 alternately switches and outputs the interpolated signal S16 and the interpolated signal S17 in each (½) H period in response to the timing signal SB output from the timing signal generator 34. Thus, signal S18 is output in which YA and CA are arranged in one horizontal (1 H) period, similarly to the signal S10 according to the first embodiment. Similarly, the selector 32 outputs signal S19 similar to the signal S12 and in the form in which CB and YB are arranged in one horizontal period.

The signal S18 output from the selector 31 is supplied to the vertical compression circuit 53 so that a process for removing unnecessary scanning lines in the signals output from the interpolation filters 51 and 52 is, for the compression process, performed in response to the timing signals SC and SC' output from the timing signal generator 34. Signal S19 output from the selector 32 is subjected to a similar process in the vertical compression circuit 54.

Signal S20 subjected to the vertical compression process in the vertical compression circuit 53 is supplied to one of input terminals of the selector 37 and that of the selector 38 so as to be again formed into signals each consisting of YA and YB in response to the timing signals SD and SD' output from the timing signal generator 34. Signal S21 subjected to the vertical compression process in the vertical compression circuit 54 is supplied to another input terminal of the selector 37 and that of the selector 38 so as to be again formed into signals each consisting of CA and CB in response to the timing signals SD and SD' output from the timing signal generator 34. The luminance signal Y7 output from the selector 37 is delayed by (½) H period by the (½) H delay circuit 39 to make coincide the degree of delay with the chrominance signal C7 (which is delayed by the (½) H delay circuit 33) output from the selector 38, and then supplied to a first input terminal of the matrix circuit 19.

The chrominance signal C7 output from the selector 38 is separated into I and Q signals by the I/Q separation circuit 23 so as to be supplied to second and third input terminals of the matrix circuit 19. The matrix circuit 19 converts the Y, I and Q signals into R, G and B signals so that a color image is displayed on the monitor 22.

FIG. 9 shows the operation for the scanning line conversion by the above-mentioned structure. In this case, a state in which the number of the scanning lines is decreased by ¾ is shown. That is, scanning lines Lx,y (x is 0, 1, 2, . . . , y is 0, 1, 2 or 3, and y is an index in a group of four scanning lines) shown in the leftmost column shown in FIG. 9 are, in units of four scanning lines, subjected to the interpolation process by the interpolation filters 51 and 52 so as to be converted into three scanning lines L(x,y') (y' is 0, 1 or 2) as shown in the intermediate column shown in FIG. 9. That is, every fourth pre-conversion scanning line is made to be unnecessary. The foregoing scanning lines L(x,y') respectively are shifted by the vertical compression circuits 53 and 54 to omit unnecessary scanning lines so that scanning lines lx,z (z: 0, 1 or 2) compressed to ¾ time are obtained as shown in the rightmost column shown in FIG. 9.

As described above, according to the second embodiment, right and left images are compressed at different vertical compression ratios when the double window display is performed. Thus, an image formed fully in the screen or an image compressed adequately can be formed with a simple structure.

Figure 10:
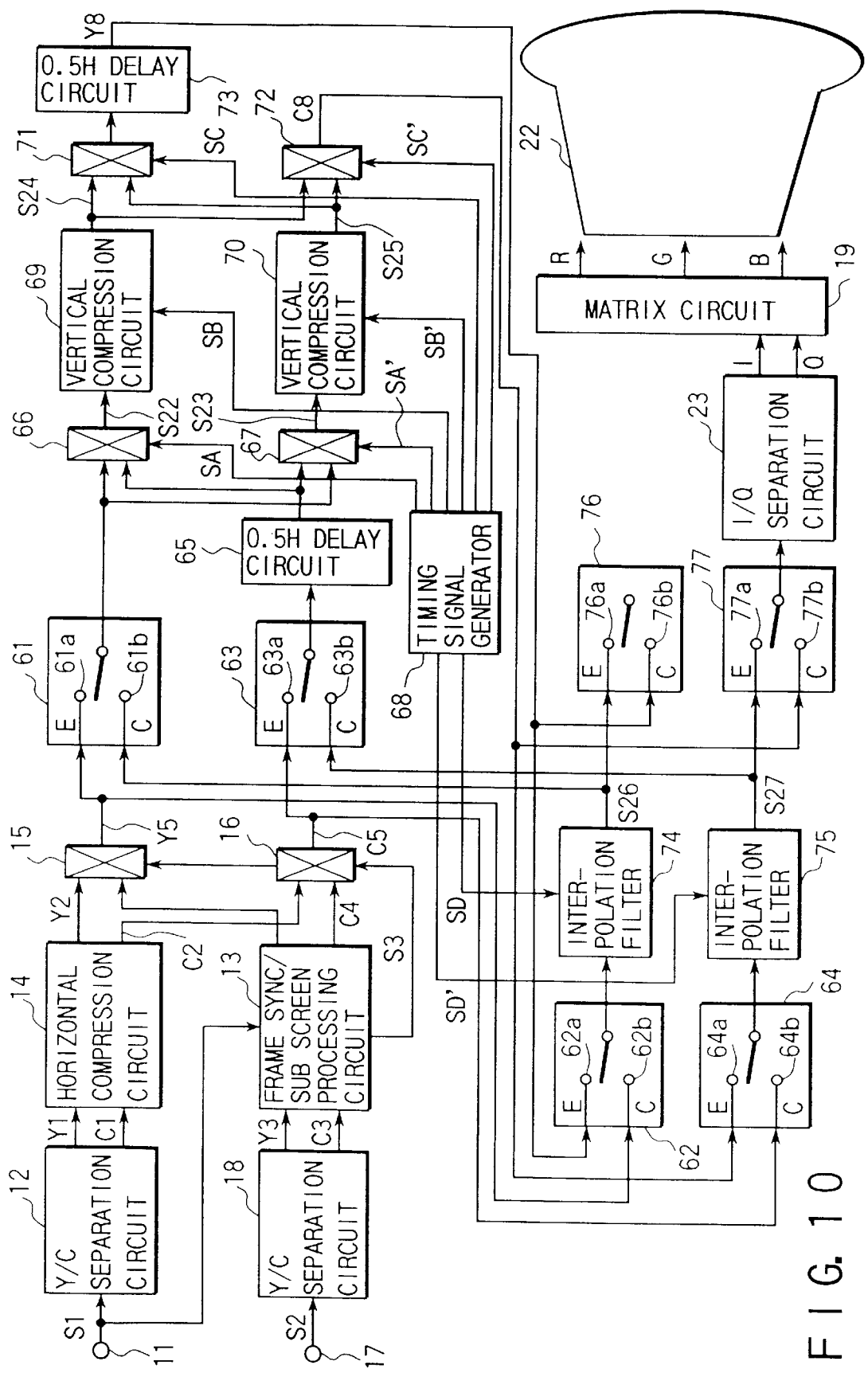
FIG. 10 is a block diagram showing a third embodiment of the present invention.

FIG. 10 is a block diagram showing a third embodiment of the present invention. Although the first and second embodiments are structured such that either the expansion or compression is performed, the third embodiment is structured to enable the expansion process and the compression process to be switched for the right and left images. In this embodiment, connection of circuit elements is switched to perform the expansion process or the compression process. Since the process to be performed to a step for synchronizing two video signals and performing the horizontal compression process is the same as that according to the first embodiment, the same elements as those shown in FIG. 5 are given the same reference numerals.

The luminance signal Y5 output from the selector 15 is supplied to an expansion-side terminal 61a of a selector 61 and a compression side terminal 62b of the selector 62. The chrominance signal C5 output from the selector 16 is supplied to an expansion-side terminal 63a of the selector 63 and a compression-side terminal 64b of the selector 64. The selector 61 has the expansion-side terminal 61a and a compression-side terminal 61b. Also the selector 62 has an expansion-side terminal 62a and the compression side terminal 62b. Selectors 63 and 64 are formed similarly to the selectors 61 and 62. The selectors 61, 63, 62, 64, 76 and 77 are operated synchronously so as to be collectively switched to the compression-side terminals or the expansion-side terminals.

The operation to be performed when the expansion process is selected will now be described. In response to a control signal supplied from an expansion/compression selector (not shown), all of the selectors 61, 62, 63, 64, 76 and 77 are switched to the expansion-side terminals.

The selectors 61 and 63 are operated such that the selector 61 outputs the luminance signal Y5 and the selector 63 outputs the chrominance signal C5 because the expansion-side terminals 61a and 63a are brought to the conductive state. The luminance signal Y5 is supplied to one of input terminals of the selector 66 and that of the selector 67. The chrominance signal C5 output from the selector 63 is, by the (½) H delay circuit 65, delayed by (½) H period, and then supplied to another input terminal of the selector 66 and that of the selector 67.

In response to the timing signal SA, the selector 66 alternately and selectively outputs the luminance signal Y5 output from the selector 61 and the chrominance signal C5 output from the (½) H delay circuit 65 in each (½) H (horizontal scanning) period. The timing signal generator 68 generates, in each (½) H period, timing signals SA, SB and SC as well as timing signals SA', SB' and SC' which are shifted in phase by (½) H period from the timing signals SA, SB and SC. Also the selector 67 alternately and selectively outputs the luminance signal Y5 output from the selector 61 and the chrominance signal C5 output from the (½) H delay circuit 65 in each (½) H (horizontal scanning) in response to the timing signal SA'.

Signal S22 selected and derived from the selector 66 is supplied to a vertical processing circuit 69. The vertical processing circuit 69 includes a memory (not shown) corresponding to the memory 351 for the expansion operation according to the first embodiment (see FIG. 5) to store the signal S22 output from the selector 66. In response to the timing signal SB, writing and reading of the signal S22 in the vertical processing circuit 69 are controlled so that the signal S22 is expanded in the vertical direction. The expanded video signal S24 is supplied to one of input terminals of the selector 71 and that of the selector 72.

Signal S23 selected and derived from the selector 67 is expanded in the vertical direction by the vertical processing circuit 70 including a memory (not shown) similarly to the vertical processing circuit 69. Expanded video signal S25 is supplied to the another input terminal of the selector 71 and that of the selector 72.

The selector 71 alternately and selectively outputs the video signal S24 output from the vertical processing circuit 69 and the video signal S25 output from the vertical processing circuit 70 in each (½) H period in response to the timing signal SC. At this time, the output is in the form in which YA and YB are sequentially arranged in each 1 H period. In response to the timing signal SC', the selector 72 alternately and selectively outputs the video signal S24 output from the vertical processing circuit 69 and the video signal S25 output from the vertical processing circuit 70 in each (½) H period. At this time, the output is in the form in which CA and CB are sequentially arranged in each 1 H period.

Luminance signal Y8 selected and derived from the selector 71 is delayed by a (½) H delay circuit 73 by (½) H period to make coincide the phase with that of the chrominance signal (which is delayed by the (½) H delay circuit 65) so as to be supplied to a terminal 62a of the selector 62. Since the terminal 62a is in the conductive state in this case, the luminance signal Y8 is supplied to the interpolation filter 74. Chrominance signal C8 selected and derived from the selector 72 is supplied to the interpolation filter 75 through the selector 64.

The interpolation filter 74 subjects the luminance signal Y8 to an interpolation process in response to timing signal SD so as to generate luminance signal Y9, the number of the scanning lines of which has been expanded to n (n is a positive real number) times, to supply the expanded luminance signal Y9 to a first input terminal of the matrix circuit 19 through the selector 76.

Similarly, the interpolation filter 75 subjects the chrominance signal C8 to the interpolation process in response to the timing signal SD' so as to generate chrominance signal C9, the number of the scanning lines of which is expanded to n (n is a positive real number) times, to supply the same to the I/Q separation circuit 23 through the selector 77. Since the coefficients of the interpolation filters 74 and 75 are different between the right window and the left window of the double window, the coefficient is switched in response to the timing signals SD and SD'.

The I/Q separation circuit 23 subjects the chrominance signal C6 to a demodulation process so as to separate the chrominance signal C6 into color difference signals I and Q to supply the same to second and third input terminals of the matrix circuit 19. The matrix circuit 19 converts the luminance signal Y6 and the chrominance signals I and Q into color signals R, G and B so as to output the same to the monitor 22.

As a result of the foregoing process, the signals S1 and S2 are expanded at the respective expansion ratios.

Then, the operation to be performed when the compression process is selected will now be described. All of the selectors 61, 62, 63, 64, 76 and 77 are switched to the compression-side terminals.

The luminance signal Y5 supplied to the compression side terminal 62b of the selector 62 is supplied to the interpolation filter 74 because the compression side terminal 62b is in the conductive state. The chrominance signal C5 supplied to the compression-side terminal 64b of the selector 64 is supplied to the interpolation filter 75 because the compression-side terminal 64b is in the conductive state.

The interpolation filter 74 converts the luminance signal Y5 into interpolated signal S26 corresponding to a required vertical compression ratio in response to the timing signal SD so as to output the same to the compression-side terminal 61b of the selector 61. In this case, the interpolated signal S26 is supplied to one of input terminals of the selector 66 and that of the selector 67 because the compression-side terminal 61b in the conductive state.

Similarly to the interpolation filter 74, the interpolation filter 75 converts the chrominance signal C5 into interpolated signal S27 corresponding to a required vertical compression ratio in response to the timing signal SD' so as to output the same to the terminal 63b of the selector 63. Since the terminal 63b is in the conductive state in this case, the interpolated signal S27 is delayed by (½) H period by the (½) H delay circuit 65, and then supplied to another input terminal of the selector 66 and that of the selector 67. If the compression ratio for the right window and that for the left window are made to be different from each other, the right and left images are discriminated in accordance with the timing signals SD and SD' and different filter coefficients are used to generate interpolated signals.

Signal S22 output from the selector 66 is supplied to the vertical processing circuit 69 so that a vertical compression process (see FIG. 9) is performed such that unnecessary scanning lines are removed from the signal output from the interpolation filters 74 and 75 in response to the timing signal SB. Signal S23 output from the selector 67 is subjected to a similar process in the vertical processing circuit 70.

Signal S24 subjected to the vertical compression process in the vertical processing circuit 69 is supplied to one of input terminals of the selector 71 and that of the selector 72 so as to be again formed into luminance signal Y8 in which YA and YB are sequentially arranged in 1 H period in response to the timing signal SC. Signal S25 subjected to the vertical compression process in the vertical processing circuit 70 is supplied to another input terminal of the selector 71 and that of the selector 72 so as to be again formed into chrominance signal C8 in which CA and CB are sequentially arranged in 1 H period in response to the timing signal SC'. The luminance signal Y8 output from the selector 71 is delayed by (½) H period by the (½) H delay circuit 73 in order to make coincide the degree of delay with the chrominance signal which is delayed by the (½) H delay circuit 65 so as to be supplied to a first input terminal of the matrix circuit 19 through the compression-side terminal 76b of the selector 76.

The chrominance signal C8 output from the selector 72 is supplied to the I/Q separation circuit 23 through the compression-side terminal 77b of the selector 77 so as to be separated into I signal and Q signal so as to be supplied to second and third input terminals of the matrix circuit 19.

In the matrix circuit 19, the Y, I and Q signals are converted into R, G and B signals so that a color image is displayed on the monitor 22.

As a result of the above-mentioned process, the signals S1 and S2 are compressed at respective compression ratios.

As described above, according to the third embodiment, right and left images are compressed or expanded with different compression or expansion ratios when the double window display is performed so that an image is fully formed in the screen or an image is adequately compressed or expanded. By switching the signal transmission passage, the signal can be processed in individual circuits between the compression process and the expansion process so that the compression/expansion is realized with the simple structure.

Figure 11:
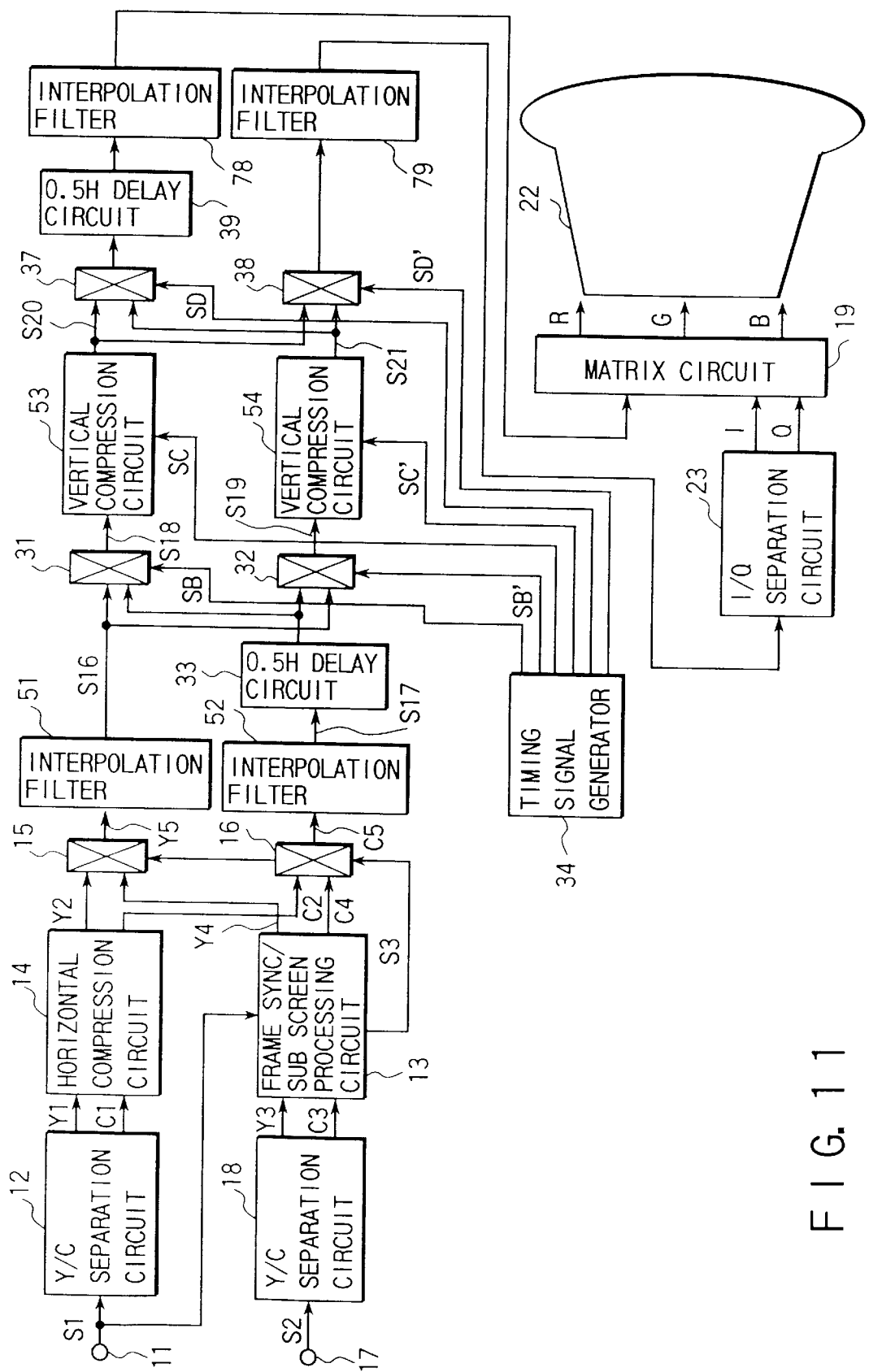
FIG. 11 is a block diagram showing a fourth embodiment of the present invention.

A fourth embodiment capable of obtaining a similar effect obtainable from the third embodiment is shown in FIG. 11. Referring to FIG. 11, the same elements as those shown in FIG. 8 are given the same reference numerals. The structure shown in FIG. 11 is different from the second embodiment shown in FIG. 8 in that an interpolation filter 78 is connected between the (½) H delay circuit 39 and the matrix circuit 19, that an interpolation filter 79 is connected between the selector 38 and the I/Q separation circuit 23, and that the vertical compression circuits 53 and 54 are replaced by the vertical processing circuits 69 and 70. That is, the interpolation filters (the interpolation filters 51 and 52) are connected just succeeding to the selectors 15 and 16 and the interpolation filters (the interpolation filters 78 and 79) are connected just preceding to the matrix circuit 19 and the I/Q separation circuit 23 so that an effect similar to that obtainable from the third embodiment is obtained.

FIG. 12 is a circuit diagram showing a fifth embodiment of the present invention. The first embodiment has the structure such that right and left images are expanded with individual expansion ratios, the second embodiment has the structure such that right and left images are compressed with individual compression ratios, and the third and fourth embodiments have the structure such that right and left images are expanded or compressed with individual expansion ratios or compression ratios. The fifth embodiment has a structure such that right and left image are subjected to different process such that either the right image or the left image is compressed and another image is expanded.

The fifth embodiment is structured on the basis of the third embodiment.

Referring to FIG. 12, the same elements as those shown in FIG. 10 are given the same reference numerals. This embodiment is different from the third embodiment shown in FIG. 10 in that the selectors 61, 62, 63, 64, 76 and 77 are not collectively switched. In this embodiment, the expansion process or the compression process can be switched in response to timing signals SE, SF and SG output from the timing signal generator 68.

Two composite video signals S1 and S2 are Y/C-separated by the Y/C separation circuits 12 and 18. Then, output signals of the Y/C separation circuits 12 and 18 are subjected to the horizontal compression process by the horizontal compression circuit 14 and to the synchronization/sub-screen processing by the synchronization/sub-screen processing circuit 13. Thus, luminance signal Y5 is output from the selector 15 and chrominance signal C5 is output from the selector 16.

The operation to be performed when the left image is expanded and the right image is compressed will now be described for example. The timing signal generator 68 generates timing signal SE for controlling selectors 61 and 63 in such a manner that the first half portions (for the left window) of the luminance signal Y5 and the chrominance signal C5 are connected to the expansion-side circuits and the second half portions (for the right window) of the same are connected to the compression-side circuits. In response to the timing signal SE, the selectors 61 and 63 are alternately switched to the compression side and the expansion side in each (½) H period. The timing signal generator 68 similarly generates timing signals SF and SG to be supplied to the selectors 62, 64, 76 and 77 to alternately switch the expansion side and the compression side in each (½) H period.

Referring to FIGS. 13A to 13P, the operation of this embodiment will now be described. The appendix letter "-I" indicate the interpolation process, "-E" the expansion process and "-C" the compression process. The luminance signal Y5 output from the selector 15 is, as shown in FIG. 13A, in the form in which luminance signal YA of the first composite video signal and luminance signal YB of the second composite video signal are located in the first and second half portions in 1 H period. The chrominance signal C5 output from the selector 16 is, as shown in FIG. 13B, in the form in which chrominance signal CA of the first composite video signal and chrominance signal CB of the second composite video signal are located in the first and second half portions of 1 H period. Outputs from the selectors 61 and 63 are, as shown in FIGS. 13C and 13D, in the form in which signals YB and CB subjected to the vertical interpolation process are located in the right window which is the second half period of 1 H period. The output (see FIG. 13D) from the selector 63 is delayed by (½) H period by the (½) H delay circuit 65 so as to be formed into a signal as shown in FIG. 13E.

Signal S22 output from the selector 66 is, as shown in FIG. 13F, in the form in which luminance signal YA is located in the first half portion of 1 H period and chrominance signal CA is located in the second half portion. Signal S23 output from the selector 67 is, as shown in FIG. 13G, in the form in which chrominance signal CB subjected to the interpolation process is located in the first half portion and luminance signal YB subjected to the interpolation process is located in the second half portion.

The signal S22 output from the selector 66 is supplied to the vertical processing circuit 69 so as to be expanded in response to the timing signal SB. Signal S24 subjected to the expansion process is supplied to one of input terminals of the selector 71 and that of the selector 72. The signal S23 output from the selector 67 is supplied to the vertical processing circuit 70 so as to be subjected to the compression process in response to the timing signal SB'. Signal S25 subjected to the compression process is supplied to another input terminal of the selector 71 and that of the selector 72.

Luminance signal Y8 output from the selector 71 is, as shown in FIG. 13H, in the form in which luminance signal YA subjected to the vertical expansion process is located in the first half portion of 1 H period and luminance signal YB subjected to the interpolation process and the compression process is located in the second half portion of the same. Then, the luminance signal Y8 is delayed by (½) H period by the (½) H delay circuit 73 so as to be supplied to a terminal 62a of the selector 62 and a terminal 76b of the selector 76. The output from the (½) H delay circuit 73 is shown in FIG. 13J. Chrominance signal C8 output from the selector 72 is, as shown in FIG. 13I, is in the form in which chrominance signal CB subjected to the interpolation process and the compression process is located in the first half portion of 1 H period and chrominance signal CA subjected to the expansion process is located in the second half portion so as to be supplied to the terminal 64a of the selector 64 and the compression-side terminal 77b of the selector 77.

The output from the selector 62 is, as shown in FIG. 13K, in the form in which the luminance signal YB output from the selector 15 is located in the first half portion of 1 H period and the luminance signal YA subjected to the expansion process is located in the second half portion so as to be subjected to the interpolation process by the interpolation filter 74. The output from the selector 64 is, as shown in FIG. 13I, in the form in which the chrominance signal CB output from the selector 16 is located in the first half portion of 1 H period and the chrominance signal CA subjected to the expansion process is located in the second half portion of the same so as to be subjected to the interpolation process in the interpolation filter 75. In response to the timing signals SD and SD', the interpolation filters 74 and 75 perform the interpolation process for the expansion for the first half portion of 1 H period and the interpolation process for the compression for the second half portion of the same. Thus, in the output signals from the filters 74 and 75, the luminance signal YB and chrominance signal CB subjected to the interpolation process are located in the first half portion of period 1 H and the luminance signal YA and chrominance signal CA subjected to the expansion process and the interpolation process are located in the second half portion of the same, as shown in FIGS. 13M and 13N. The output from the interpolation filter 74 is supplied to the terminal 61b of the selector 61 and the terminal 76a of the selector 76, while the output from the interpolation filter 75 is supplied to the terminal 63b of the selector 63 and the terminal 77a of the selector 77.

The selector 76 is controlled in response to the timing signal SG output from the timing signal generator 68 so as to output a signal in which the luminance signal YB subjected to the compression and interpolation processes is located in the first half portion of 1 H period and luminance signal YA subjected to the expansion and interpolation processes is located in the second half portion of the same, as shown in FIG. 13O. The selector 77 is controlled in response to the timing signal SG output from the timing signal generator 68 so as to output a signal in which the chrominance signal CB subjected to the compression and interpolation processes is located in the first half portion of 1 H period and the chrominance signal CA subjected to the expansion and interpolation processes is located in the second half portion of the same, as shown in FIG. 13P.

The output (see FIG. 13O) from the selector 76 is supplied to a first input terminal of the matrix circuit 19 while the output from the selector 77 is separated into I signal and Q signal by the I/Q separation circuit 23 so as to be supplied to second and third input terminals of the matrix circuit 19. The matrix circuit 19 converts the Y, I and Q signals into R, G and B signals to output the same to the monitor 22.

As described above, according to the fifth embodiment, the right window and the left window can individually be expanded and compressed when the double window display is performed. Although the description has been performed about the structure in which the left window is subjected to the expansion process and the right window is subjected to the compression process, the processes for the right window and the left window may, of course, be interchanged.

Although the foregoing embodiments have the structure such that the (½) H delay circuits 39 and 73 are operated to adjust the degree of delay of the luminance and chrominance signals, the (½) H delay circuits 39 and 73 can be omitted by changing the tap length of the digital filter for use in the interpolation filter for the luminance signal Y and the chrominance signal C. The reason why the delay circuits 39 and 73 delay the luminance signal Y is that the preceding delay circuits 33 and 65 delay the chrominance signal C. Since the vertical frequency band of the chrominance signal C is narrower than that of the luminance signal Y in the general television signal, the number of the filter taps for use to perform the interpolation process for the chrominance signal C can be reduced. Therefore, the delay circuits 39 and 73 for delaying the luminance signal can be omitted by adjusting the number of the filter taps.

The vertical expansion and compression process for the right and left windows of the double window screen may, of course, be applied to PAL and SECAM systems, as well as the television signals represented by the NTSC system. Moreover, the foregoing processes may be applied to video signals, such as the high-vision signal, exhibiting superior resolution (having a larger pixels) to the conventional television signal.

Although the foregoing embodiments have been described to have the structure such that different video signals are supplied to the input terminals 11 and 17, same video signals may be supplied to expand or compress the same images with different ratios in the right and left windows.

Further, the present invention can be used for a double window screen in which the right and left windows does not have the same size. In this case, the delay time of the delay circuits 33, 39, 65 and 73 are not (½) H but according to the width of the windows.

As described above, according to the present invention, when the same, for example, NTSC video signals, are received by the input terminals 11 and 17 and programs or the like of the same channel or different channels are watched by the double window display method, the vertical expansion or compression can individually be performed for the right and left windows. As a result, more preferred programs can be present to the viewers.

In a case where the signal is separated into the luminance signal Y and the chrominance signal C, memories for individually expanding or compressing the right and left images of the double window screen in the vertical direction are not required. Therefore, the vertical expansion or the compression can be performed without the necessity of enlarging the circuit structure.

Therefore, the double window display apparatus can be provided which is capable of individually vertically expanding or compressing right and left images of the double window display without the necessity of enlarging the circuit structure.

What is claimed is:

1. A double window display apparatus in which a display screen is divided into a right window and a left window to display a first image on the right window and a second image on the left window, said double window display apparatus comprising:

first separation means for separating the first image into a third image and a fourth image for each horizontal scanning period;

second separation means for separating a second image into a fifth image and a sixth image for each horizontal scanning period;

first synthesizing means for synthesizing the third image and the fifth image in one horizontal scanning period;

second synthesizing means for synthesizing the fourth image and the sixth image in one horizontal scanning period;

first conversion means having a first memory for storing an output from said first synthesizing means and for controlling writing/reading of said first memory to expand or compress an output image from said first synthesizing means in the vertical direction;

second conversion means having a second memory for storing an output from said second synthesizing means and for controlling writing/reading of said second memory to expand or compress an output image from said second synthesizing means in the vertical direction;

third separation means for separating an output from said first conversion means into a seventh image formed by expanding or compressing the third image in the vertical direction and an eighth image formed by expanding or compressing the fifth image in the vertical direction;

fourth separation means for separating an output from said second conversion means into a ninth image formed by expanding or compressing the fourth image in the vertical direction and a tenth image formed by expanding or compressing the sixth image in the vertical direction;

third synthesizing means for synthesizing the seventh image and the ninth image; and fourth synthesizing means for synthesizing the eighth image and the tenth image.

2. An apparatus according to claim 1, in which the third image is a first luminance signal of the first image, the fourth image is a first chrominance signal of the first image, the fifth image is a second luminance signal of the second image and the sixth image is a second chrominance signal of the second image.

3. An apparatus according to claim 1, in which said first synthesizing means comprises means for synthesizing the first luminance signal and the first chrominance signal to generate the first image to be displayed on the right window;

said second synthesizing means comprises means for synthesizing the second luminance signal and the second chrominance signal to generate the second image to be displayed on the left window;

said first conversion means comprises means for expanding or compressing the first image to be displayed on the right window; and said second conversion means comprises means for expanding or compressing the second image to be displayed on the left window.

4. A double window display apparatus in which a display screen is divided into a right window and a left window to display a first image on the right window and a second image on the left window, said double window display apparatus comprising:

first separation means for separating the first image into a third image and a fourth image for each horizontal scanning period;

second separation means for separating the second image into a fifth image and a sixth image for each horizontal scanning period;

first vertical processing means for subjecting the third image to a filtering process in the vertical direction;

second vertical processing means for subjecting the fourth image to a filtering process in the vertical direction;

third vertical processing means for subjecting the fifth image to a filtering process in the vertical direction;

fourth vertical processing means for subjecting the sixth image to a filtering process in the vertical direction;

first synthesizing means for synthesizing an output from said first vertical processing means and an output from said third vertical processing means;

second synthesizing means for synthesizing an output from said second vertical processing means and an output from said fourth vertical processing means;

first conversion means having a first memory for storing an output from said first synthesizing means and for controlling writing/reading of said first memory to expand or compress an output image from said first synthesizing means in the vertical direction;

second conversion means having a second memory for storing an output from said second synthesizing means and for controlling writing/reading of said second memory to expand or compress an output image from said second synthesizing means in the vertical direction;

third separation means for separating an output from said first conversion means into a seventh image formed by expanding or compressing an output from said first vertical processing means in the vertical direction and an eighth image formed by expanding or compressing an output from said third vertical processing means in the vertical direction;

fourth separation means for separating an output from said second conversion means into a ninth image formed by expanding or compressing an output from said second vertical processing means in the vertical direction and a tenth image formed by expanding or compressing an output from said fourth vertical processing means in the vertical direction;

fifth vertical processing means for subjecting the seventh image to a filtering process in the vertical direction;

sixth vertical processing means for subjecting the eighth image to a filtering process in the vertical direction;

seventh vertical processing means for subjecting the ninth image to a filtering process in the vertical direction;

eighth processing means for subjecting the tenth image to a filtering process in the vertical direction;

third synthesizing means for synthesizing an output from said fifth vertical processing means and an output from said seventh vertical processing means; and fourth synthesizing means for synthesizing an output from said sixth vertical processing means and an output from said eighth vertical processing means.

5. An apparatus according to claim 4, which further comprising:

control means for generating a control signal for setting a first processing mode or a second processing mode, said first vertical processing means, said second vertical processing means, said third vertical processing means and said fourth vertical processing means performing filtering processes in the vertical direction in said first processing mode and said fifth vertical processing means, said sixth vertical processing means, said seventh vertical processing means and said eighth vertical processing means performing the filtering processes in the vertical direction in said second processing mode.

6. An apparatus according to claim 4, in which the third image is a first luminance signal of the first image, the fourth image is a first chrominance signal of the first image, the fifth image is a second luminance signal of the second image and the sixth image is a second chrominance signal of the second image.

7. An apparatus according to claim 4, in which said first synthesizing means comprises means for synthesizing the first luminance signal and the first chrominance signal to generate the first image to be displayed on the right window;

said second synthesizing means comprises means for synthesizing the second luminance signal and the second chrominance signal to generate the second image to be displayed on the left window;

said first conversion means comprises means for expanding or compressing the first image to be displayed on the right window; and said second conversion means comprises means for expanding or compressing the second image to be displayed on the left window.

* * * * *